Figure 1:
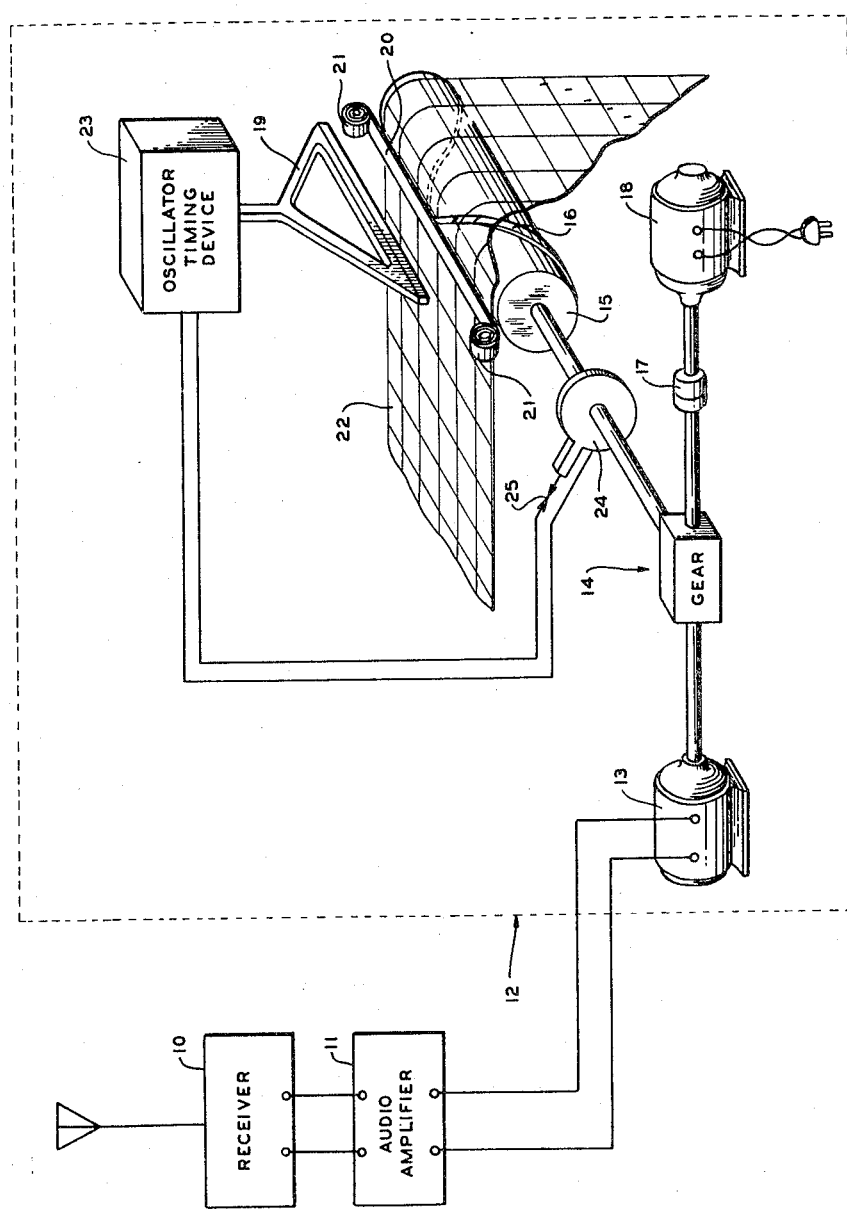

Sept. 12, 1950 — V. E. SUOMI — 2,521,881
AUDIO-FREQUENCY RECORDER
Filed Dec. 1, 1944 — 3 Sheets-Sheet 1

INVENTOR.
Verner E. Suomi
BY
William D. Hall,
ATTORNEY

INVENTOR.
VERNER E. SUOMI

INVENTOR.
VERNER E. SUOMI

Patented Sept. 12, 1950

2,521,881

UNITED STATES PATENT OFFICE 2,521,881

AUDIO-FREQUENCY RECORDER

Verner E. Suomi, Chicago, Ill.

Application December 1, 1944, Serial No. 566,163

9 Claims. (Cl. 346—33)

The invention described herein may be manufactured and used by or for the Government for governmental purposes, without the payment to me of any royalty thereon.

The present invention pertains to audio frequency recording apparatus, and more particularly but not exclusively to such apparatus adapted to operate in conjunction with the ground station of a radiosonde system.

There exist numerous applications for audio frequency recorders. For purposes of illustration, the present invention will be described as it operates in association with the ground station of a radiosonde system of the variable frequency type, although the invention is obviously not limited thereto. In one of such systems heretofore in use, a radio frequency transmitter, having audio frequency modulation means, is attached to a balloon. The modulation frequency of the transmitter is controlled sequentially by each of a plurality of meteorological elements in accordance with the atmospheric condition being measured. At the ground station the signals from the balloon are received and detected to derive the audio-frequency modulation component thereof. The audio signals thus obtained are impressed upon an electronic frequency meter which converts the signals into a direct current proportional to the audio frequency. The direct current is fed to an indicator type meter movement; then by the use of a light source and photo-cell equipment a pulse is produced which is amplified and fed to a complicated mechanical recorder which impresses upon a continuous tape marks whose position is a function of the applied frequency. By properly graduating the tape, a direct frequency reading may be obtained.

It is the principal object of the present invention to provide apparatus for recording audio frequency signals directly, without first converting said signals to direct current by means of an electronic frequency meter.

It is another object of this invention to provide apparatus of the above mentioned type characterized by a high degree of sensitivity but having sufficient inherent inertia to eliminate noise.

It is a further object of this invention to provide such apparatus whereby audio frequency impulses shall be translated to give a linear response.

Yet another object of this invention is to provide such apparatus that shall be of simple Briefly stated, the objects of this invention are attained by the use of a rotating helix whose angular velocity is governed by the frequency to be recorded. A tapper bar is arranged so as to be capable of depression against the helix. A timing device is provided controlling the tapper bar in a manner whereby the bar is depressed against the helix at a constant time interval after the helix rotates through a predetermined fixed position such that the frequency is recorded on a continuous paper strip passing between the helix and the tapper bar in terms of the distance across the helix at the time the tapper bar is depressed against the helix.

Figure 2:
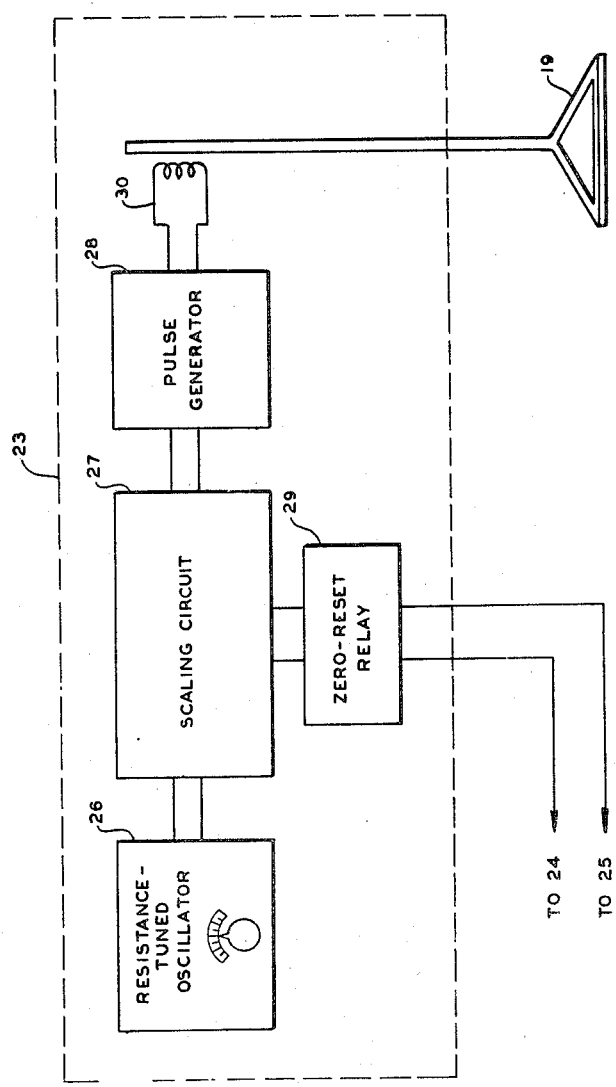
Figure 3:
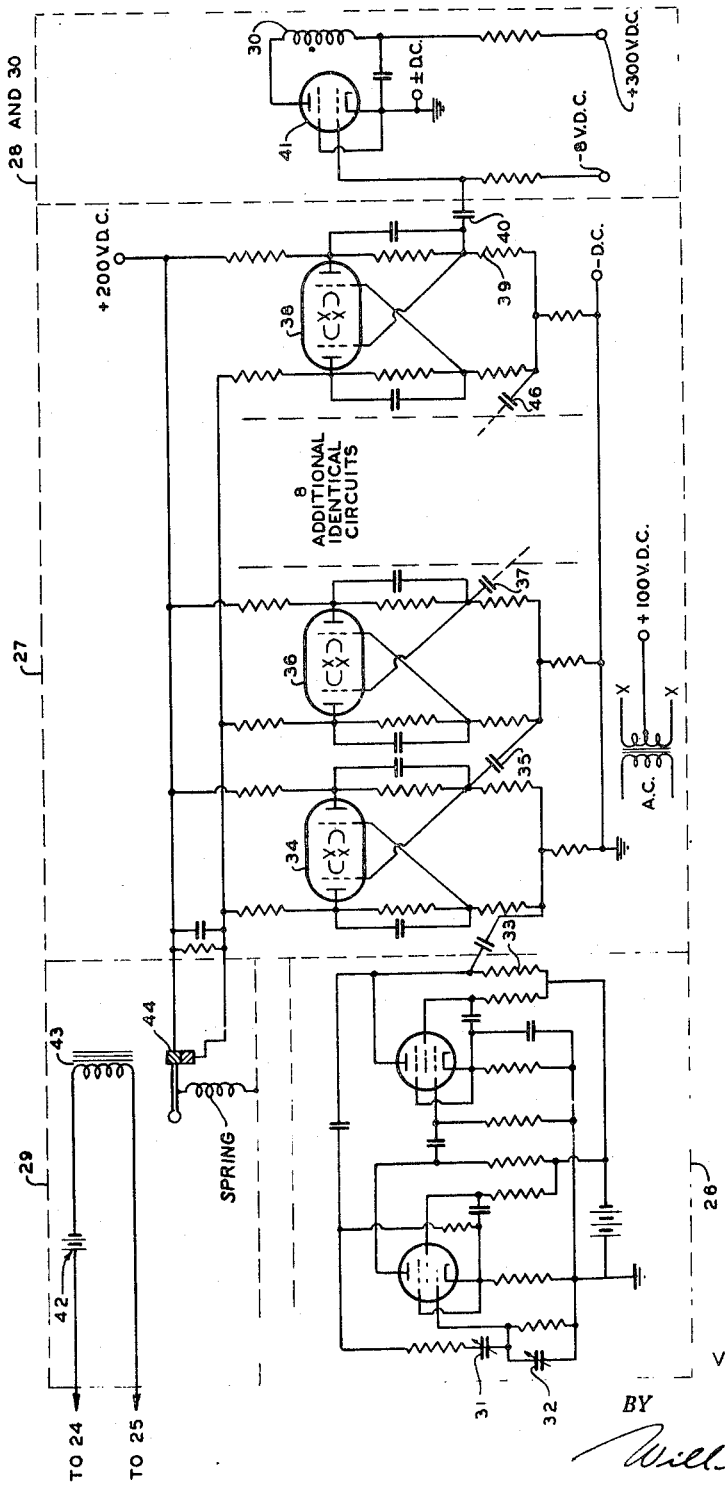

For a better understanding of this invention, together with other and further objects thereof, reference is had to the attached drawings illustrating a preferred embodiment of the invention. The scope of the invention will be pointed out in the annexed claims. In the drawings:

Fig. 1 represents a schematic diagram of the recorder, showing the source of the audio-frequency impulses to be measured, the essential mechanical parts of the device, and the connection between the oscillator timing device and the mechanical parts, Fig. 2 represents a schematic diagram of the essential elements of the oscillator timing device, and Fig. 3 illustrates in detail the component parts of the various elements of the oscillator timing device.

Referring now to the drawing and more particularly to Fig. 1, a variable frequency radiosonde ground station is illustrated including a receiver 10 of conventional design for intercepting and detecting modulated radio-frequency signals from a radiosonde transmitter, an audio frequency amplifier 11 for increasing the magnitude of audio-frequency modulation component yielded by receiver 10 to a level sufficient to operate a recorder 12, functioning in accordance with the invention. The output of audio-frequency amplifier 11 is applied to a synchronous motor 13, of any suitable design, which rotates at a speed determined by the frequency of the applied current. The shaft of synchronous motor 13 is coupled through a gear mechanism 14 to a cylinder 15, having circumferentially mounted thereon, from one end thereof to the other, a raised helix 16. Also mechanically coupled to cylinder 15 through a non-positive or slip coupling such as friction clutch 17 is a the clutch, but to permit motor 17 to rotate relative to the cylinder drive means.

Disposed directly above cylinder 15 is a tapper bar 19. Interposed between the face of tapper bar 19 and cylinder 15, and running parallel therewith, is an inked ribbon 20, the ends thereof being wound on reels 21 so as to secure the ribbon taut. A continuous strip of paper 22 is arranged to pass over cylinder 15 in order that a permanent record be made of the audio-frequencies applied to the recorder. The tapper bar 19 is actuated by an oscillator timing device 23 which serves to reciprocate tapper bar 19 whereby it periodically strikes that point on helix 16 aligned therewith through ribbon 20 and paper strip 22. Thus, in the event that cylinder 15 were rotated at a continuous speed, marks would be formed across paper strip 22 at evenly spaced positions.

An arm 24 is rigidly attached to the helix shaft and rotates with it. The end of the arm makes contact with brush 25 once in every revolution, and is so adjusted that the contact is broken at the exact moment the helix 16 is in the "zero" position, that is, when the helix is in a position such that if the tapper bar were depressed, the recording would be at the edge of the paper on the zero line.

In operation, motor 18 is energized causing cylinder 15 to rotate. Another motor (not shown) actuates a paper drive, which slowly draws the paper 22 over the helix cylinder 15. The torque applied through clutch 17 to gear 14 is of such a value as to be sufficient to rotate the cylinder 15 at the greatest angular velocity ever needed, but at the same time always less than the braking torque developed by the synchronous motor 13.

The audio-frequencies to be recorded are fed to synchronous motor 13 thereby developing a torque which results in the braking action on the helix 16 proportional to the audio-frequency applied to synchronous motor 13. This effect is accomplished by having the continuous torque on helix 16 applied through clutch 17 by motor 18 made less than the braking torque of synchronous motor 13. While the speed of motor 18 may be greater than that of synchronous motor 13, the angular velocity of helix 16 is equal to that of the synchronous motor because of the slipping action of clutch 17. Since the angular velocity of helix 16 will vary as a function of audio-frequency, the displacement of the marks on paper 22 formed by the action of tapper bar 19 will be correspondingly adjusted. By graduating paper 22 in terms of frequency a direct reading may be obtained.

It is necessary that the oscillator timing device 23, which controls the tapper bar 19, start counting the constant time interval at the exact moment the helix passes through the "zero" position. After it has counted a certain constant time interval it depresses the tapper bar 19 onto the paper and helix.

The construction and operation of the oscillator timing device can be understood from a consideration of Figs. 2 and 3. Referring to Fig. 2, 29 is a zero-reset relay which accomplishes the initiation of the time interval, and which derives its control from arm 24 and brush 25 of Fig. 1. When the contact between 25 and 24 is broken after it has been made, the zero-reset relay actuates scaling circuit 27 which is inoperative when 24 and 25 are in contact. Resistance-tuned oscillator 26 generates electrical oscillations of a constant frequency. Scaling circuit 27 begins to count these oscillations the moment contact between 24 and 25 is broken. After it has counted a certain number of the oscillations it energizes pulse generator 28 which sends a pulse of current through the magnetic coil 30 which in turn depresses the tapper-bar 19 against the paper and helix.

In Fig. 3 the elements of the timing device are shown schematically in greater detail. The zero-reset relay 29 is shown to comprise a relay 44, which is normally closed and only opens when contact is made between arm 24 and brush 25. When this contact is made, a current derived from cell 42 actuates the coil 43 and opens the relay 44, thereby removing much of the plate voltage from one section of each of the triode tubes 34, 36, 38 and rendering them inoperative. In this figure, the elements comprising the resistance-tuned oscillator 26 are shown. This type of oscillator is well known in the art and no particular description is necessary, except to say that it generates an electrical oscillation of constant frequency. This frequency can be varied by adjusting the two variable condensers 31 and 32, which are normally "ganged" together. The control knob for these condensers is brought outside the unit and can be seen in Fig. 2. The output of the oscillator is derived from the voltage developed across resistor 33, and this output is applied to the input of the scaling circuit 27. Scaling circuits are also well known to the art and it is not considered necessary to describe the working of the present one in detail. Reference is made to the article by Potter in the June, 1944, issue of Electronics magazine. Tubes 34, 36 and 38 each comprise, together with their associated resistors and condensers, a circuit which divides the frequency of oscillations impressed on it in half. There are a total of eleven of these units in the scaling circuit 27 of the present device, eight of them not being shown, and consequently they divide the original frequency by 2048. Coupling between the stages of the scaling circuit is obtained by the use of condensers 35, 37 and 46, the ones for the additional circuits not being shown.

In operation, the resistance-tuned oscillator is functioning at all times. Assume that 24 and 25 are in contact and that the scaling circuit 27 is inoperative, as explained above. When the contact is broken between 24 and 25, the scaling circuit begins to divide the frequency generated by 26 by 2,048. In other words when 2,048 oscillations have taken place in the oscillator 26, the final unit in the scaling circuit has made one oscillation. When this one oscillation has been made in the final stage of the scaling circuit, which includes tube 38, the output across resistor 39 is fed through condenser 40 into pulse generator 28. The oscillation causes a sharp pulse of current to pass through tube 41 and magnetic coil 30, and this causes the tapper-bar 19 to be sharply depressed against the paper and helix. Thereafter, the tapper-bar will be depressed against the helix after another 2,048 oscillations of the oscillator 26 have taken place, and this will continue until the plate voltage on the scaling circuit tubes is reduced by contact between 24 and 25. The exact length of time for the oscillator to generate the 2,048 oscillations, and consequently the time interval between actuations of the tapper-bar, depends upon the frequency of its oscillation, and this can be controlled, as before stated, by the adjustment of the variable condensers 31 and 32. This adjustment makes it possible to manually shorten or lengthen the distance from the end of the helix cylinder that a mark on the paper will be made by the tapper bar for a given angular velocity of the cylinder. This makes it easy to calibrate the device by impressing a known frequency into the motor 13, and is particularly useful for radiosonde operation as a reference adjustment.

It might be added that type 3A5 tubes were found particularly useful for the tubes 34, 36, 38, and the others not shown in the scaling circuit, while type 2050 was found satisfactory for tube 41 in the pulse generator.

Although the novel synchronous drive disclosed herein has been applied to a recorder, it is obvious that it is of general utility and may be used wherever it is desired to synchronize the speed of rotation of an element with the frequency of an alternating current. This synchronous driver per se is being claimed in my copending divisional application, Serial No. 113,657, filed September 1, 1949.

While one preferred embodiment of the invention has been described it will be obvious that many modifications thereof may be made without departing from the invention and it is therefore aimed in the appended claims to cover all such changes and modifications as fall within the true spirit and scope of the invention.

What is claimed is:

1. A system for indicating changes in frequency of an audio frequency current, comprising a recording printer, said printer including a continuously rotatable helix, means to control the rotation of said helix at a speed governed by the frequency of said current, said control means being a synchronous motor energized by and rotating at a speed proportional to the frequency of said current, a tapper bar mounted for movement against said helix, means to advance a paper strip between said helix and said tapper bar for receiving recorded impressions, and timer means to periodically move said tapper bar against said helix at constant time intervals after the helix has passed through a predetermined position at each rotation of said helix.

2. A recorder for indicating changes in the frequency of audio frequency currents, including a rotatable helix, means to govern the rotation of said helix at a speed proportional to the frequency of said currents, a tapper bar mounted for movement against said helix, means to advance a paper strip at a constant speed between said tapper bar and said helix, means to rotate and control the angular velocity of the helix, said last named means including a source of continuous torque applied to the helix, and a synchronous motor actuated by the audio frequency currents aforesaid and coupled to said helix to act as a brake thereon and thereby control the angular velocity of said helix.

3. A recorder as set forth in claim 2, including a slip coupling between said source of continuous torque and said helix.

4. A recorder as set forth in claim 3, wherein said slip coupling is a friction coupling.

5. A recorder for indicating changes in the frequency of an audio frequency current, comprising a rotatable helix, means controlled by said current to rotate said helix at a speed proportional to the frequency of said current, a tapper bar mounted for movement against said helix, means to advance a paper strip between said tapper bar and said helix, and time delay means to actuate said tapper bar during each rotation of said helix at a fixed time interval after said helix has rotated through a predetermined fixed position in each revolution thereof.

6. A recorder for indicating changes in frequency of a current comprising a continuously rotatable helical element and means to rotate said helical element at a speed governed by the frequency of said current, a second element which when actuated cooperates with said rotatable helical element to effect a recording operation, and timer means operated in response to each rotation of said helical element to actuate said second element a fixed time interval after said rotatable helical element has passed through a predetermined position at each rotation thereof.

7. A recorder for indicating changes in frequency of a current comprising a continuously rotatable helical element and means to rotate said helical element at a speed governed by the frequency of said current, a second element which when actuated cooperates with said rotatable helical element to effect a recording operation, and timer means to actuate said second element a fixed time interval after said rotatable helical element has passed through a predetermined position at each rotation thereof.

8. A recorder for indicating changes in frequency comprising a continuously rotatable element and means to rotate said element at a speed governed by said frequency, a second element which when actuated cooperates with said rotatable element to effect a recording operation, and time controlled means to actuate said second element a fixed time interval after said rotatable element has passed through a predetermined position at each rotation thereof.

9. A recorder for indicating frequency comprising a movable element and means to cyclically move said element at a rate governed by said frequency, a second element which when actuated cooperates with said movable element to effect a recording operation, and means to actuate said second element a fixed time interval after said movable element has passed through a predetermined position at each cycle of movement thereof.

VERNER E. SUOMI.

REFERENCES CITED

The following references are of record in the file of this patent:

UNITED STATES PATENTS

| Number | Name | Date |
|---|---|---|
| 1,598,739 | Mettler | Sept. 7, 1926 |
| 1,818,963 | Tolson | Aug. 11, 1931 |
| 1,828,944 | Rossman | Oct. 27, 1931 |
| 1,967,072 | Young | July 17, 1934 |
| 2,178,225 | Diehl et al. | Oct. 31, 1939 |
| 2,228,883 | Morgan | Jan. 14, 1941 |